United States Patent [19] [11] 3,951,919
Pinfold et al. [45] Apr. 20, 1976

[54] HEAT-SOFTENABLE POLYESTERURETHANE ADHESIVE

[75] Inventors: Raymond N. F. Pinfold, Frisby-on-the-Wreake; Austin T. Carpenter, Leicester; John R. Hall, Old Dalby; Alan Hardy; Jogindar Johl, both of Leicester, all of England

[73] Assignee: USM Corporation, Boston, Mass.

[22] Filed: Aug. 23, 1974

[21] Appl. No.: 500,112

[30] Foreign Application Priority Data
Aug. 23, 1973 United Kingdom............ 39906/73

[52] U.S. Cl. .......................... 260/75 NK; 12/145; 428/425
[51] Int. Cl.² ................ C08G 18/42; A43B 9/12; B32B 27/40
[58] Field of Search .............................. 260/75 NK

[56] References Cited
UNITED STATES PATENTS

| | | |
|---|---|---|
| 2,650,212 | 8/1953 | Windemuth.................. 260/75 NK |
| 2,801,648 | 8/1957 | Anderson et al............... 260/75 NK |
| 2,982,754 | 5/1961 | Sheffer et al................... 260/75 NK |
| 3,538,055 | 11/1970 | Camilleri et al............... 260/75 NP |
| 3,763,079 | 10/1973 | Fryd.............................. 260/75 NK |
| 3,803,098 | 4/1974 | Schmitt et al................. 260/75 NK |

Primary Examiner—H. S. Cockeram
Attorney, Agent, or Firm—Benjamin C. Pollard; Vincent A. White; Richard B. Megley

[57] ABSTRACT

Heat softenable adhesive, particularly in film form, and based on polyurethane from reaction of a diisocyanate and a polyester glycol including terephthalic acid and hexane diol, 1,6 units, especially useful in a shoe making method in which a film of the adhesive is disposed between the attaching surface of a shoe upper and edge portions of a mold and hot molten plastic is injected into the mold to melt and activate the adhesive and to form a tread member strongly adhered to the shoe bottom with the aid of the adhesive.

10 Claims, No Drawings

HEAT-SOFTENABLE POLYESTERURETHANE ADHESIVE

FIELD OF THE INVENTION

This invention relates to improvements in adhesives particularly useful for shoe making and to a shoe making process in which the strength of bond between the soling material and the shoe is improved with the aid of the adhesive.

BACKGROUND OF THE INVENTION

It has been proposed to make shoes by a so-called string lasting process in which an upper is closed, a draw string is attached to the periphery of the sole attaching margin as by overlocked thread, the upper is transferred to a foot form of a sole molding machine and the draw string is tensioned to bring the roughened area of the upper to a bottom surface of the mold. Subsequently the foot form is presented to a mold cavity of the sole molding machine, and hot polyvinyl chloride compound is injected into the closed cavity to form a sole attached to the shoe upper.

With many shoe upper materials the union between the shoe upper and the molded-on sole is not sufficiently strong. To overcome this weakness, U.S. Pat. to Chandler et al No. 3,522,343 of July 28, 1970 has proposed that a thin sheet of heat activatable adhesive be disposed on the attaching surface of the bottom of the shoe upper before molding on the sole. When hot plastic sole forming material is molded against the bottom of the shoe, the adhesive is activated and establishes a firm bond between the molded on sole and the attaching surface of the shoe.

Desirably, an adhesive for commercial use in film form in a string lasting process for adhering the sole to the shoe upper, should satisfy at least some of a number of criteria to some extent, including for example capacity to be produced as a handleable film (preferably a self-supporting film requiring no interleaving paper), ease of activation, to an extent sufficient to adequately wet the upper, by molten PVC which is frequently injected at a temperature of the order of 170°C. to 180°C., the ability to provide a bond which when warm is of adequate strength, and rapid build up of adhesive strength to provide a firm bond showing toughness, flexibility and no substantial creep. Desirably also, the adhesive will form acceptable bonds to leather uppers made from materials of various qualities.

Whilst various polyester based, and polyurethane based adhesives have been proposed for use in the shoe making and other trades, not all of them can be provided in the form of films with appropriate handling, heat activation and other properties.

BRIEF SUMMARY OF THE INVENTION

It is an object of the present invention to provide a heat softenable adhesive composition having properties fitting it for use in the form of a film particularly for adhesive composition.

It is a further object of the present invention to provide an improved shoe making process giving an improved bond between a shoe upper and a sole molded thereon.

To these ends and in accordance with a feature of the present invention we have provided a new heat softenable polyurethane based adhesive including the reaction product of a diisocyanate and a polyester glycol from condensation of acids including terephthalic acid and diols including hexane diol-1,6.

In accordance with a further feature of the invention, the novel adhesive composition in the form of a film is disposed between the attaching surface of a shoe upper and a mold where it is brought to active adhesive condition by heat from molten plastic material injected into the mold and forms when the molded sole has cooled a strong adhesive union between the shoe upper and the molded on sole or other tread member.

DESCRIPTION OF PREFERRED EMBODIMENT

We have now found that certain isocyanate extended 1,6-hexane diolterephthalate based polyesters possess particular properties which render them suitable for use as adhesives for various material including use in the form of a film in a process of molding and directly attaching soles of PVC compound to string lasted leather shoe uppers.

The present invention may be considered to provide for example in one of its various aspects an adhesive composition comprising a heat softenable polyurethane having a relative viscosity (as defined) in the range 1.36 to 2.10 formed from diisocyanate and substantially linear hydroxyl bearing polyester material. The polyester material comprises a homo-or copolyester having a relative viscosity of 1.10 to 1.36 (as defined) and is made up of acid units of which not less than 60 mole % are derived from terephthalic acid, and diol units of which not less than 60 mole % are derived from hexane diol-1,6 units.

The expression "relative viscosity" where used herein is defined as the relative viscosity of a solution of the material measured in a solution in reagent grade m-cresol of 1 gm. of the material per 100 cc of solution according to British Standard Method for the Determination of the Viscosity of Liquids in C.G.S. Units, BS 188:1957 at 25 ± 0.05°C. in a suspended level viscometer.

In an adhesive composition which is intended for use in film form in a process of molding and directly attaching soles of PVC compound to string lasted leather uppers the polyester may be a simply poly (hexamethylene terephthalate) with a relative viscosity from 1.10 to 1.20. Poly(hexamethylene terephthalates) with relative viscosities less than 1.10 tend to yield polyurethanes which are rather brittle and thus less suitable for use as films, whereas poly(hexamethylene terephthalates) with relative viscosities greater than 1.20 tend to yield polyurethanes which have a somewhat lower capacity for softening by heating.

A quantity of diol derived units or acid derived units in addition to hexane diol-1,6 derived and terephthalic acid derived units in the polyester tends to yield more flexible, less brittle polyurethanes with improved capacity for heat activation; thus, suitably, such polyester material with relative viscosities of 1.10 to 1.36, more preferably 1.12 to 1.20, may be used. Additional diol derived units may be introduced to the polyester by use of a "second diol" introduced as partial replacement of hexane diol-1,6 prior to reaction with the acid component used in making the polyester. This second diol may be of the general formula $C_nH_{2n+2}O_2$, for example a primary substituted paraffin of which ethylene glycol, butane diol-1,4 and pentane diol-1,5 are examples, a secondary substituted paraffin of which pentane diol-1,4 is an example and the homologous series of glycols, e.g. propylene glycol. Diol substituted branched paraffins such as neopentandiol may also be used. Other materials suitable as the second diol include diethylene glycol, triethylene glycol, alicyclic diols such as cyclohexane dimethanol, and aromatic dihydroxy compounds such as p-xylylene glycol or the reaction products of ethylene oxide or propylene oxide with bisphenol-A. These two last mentioned diols are commercially available under the trade names Dianol 22 and Dianol 33. Of these materials, we prefer to use pentandiol-1,5 as the second diol.

Additional acid derived units may be introduced to the polyester by use of a "second acid" introduced as partial replacement of terephthalic acid prior to reaction with the diol component used in making the polyester. This second acid may be an aliphatic material having 3 to 32 carbon atoms per molecule, e.g. adipic acid, "dimer acids", an alicyclic dibasic acid e.g. orthophthalic acid. We prefer to use isophthalic acid as the second acid. The polyester may be based on both mixed diols and mixed acids.

We believe that rapid and extensive crystallisation of poly(hexamethylene terephthalate) arises from the ease of packing of hexamethylene or terephthalate sections when the product solidifies. The introduction of units derived from a second diol or a second acid interferes with the regularity of the molecular chains and modifies the crystallinity habit of the product resulting in tougher films, easier melting of the film and less strain within the adhesive bond when crystallisation occurs. If the substitution of the modifiers is taken to excess, the crystallinity will be so affected that desirable qualities arising from it will be lost, and consequently low hot strength and significant creep in the completed bond may ensue.

The quantity of units other than terephthalic acid units or hexane diol-1,6 units in the polyester may be chosen for example in accordance with the types of leather which the adhesive composition is intended to bond, and in accordance with the intended mode of supply of the adhesive composition. For example, we have observed that greater bond strength may be achieved on many leathers using adhesives according to the present invention in which greater quantities of isophthalic acid derived units or pentane diol-1,5 derived units are included in the polyester. However, this improvement in bond strength is frequently accompanied by a corresponding decrease in creep resistance, and an increasing tendency of films of the adhesive to block together when stored in contact.

Where it is desired to supply the adhesive film as a self-supporting film with no interleaving release paper for use with various grades of leather ranging from those which are difficult to bond to those which are comparatively easy to bond after moderate roughing, we prefer to use the second diol and/or the second acid in quantities to provide a total substitution in the polyester chain of about 15 to about 33 mole % second units. For use with those leathers which are comparatively easy to bond after moderate roughing we may use a polyester with 3 to 15 mole % pentane diol-1,5 derived units or 2 to 10 mole % isophthalic acid derived units.

When the polyester is made up of units from mixed diols or mixed acid, its relative viscosity may preferably be in the range 1.12 to 1.20. Blends of polyesters may be used in which the relative viscosity of the blend is in this range.

In the adhesive composition preceding, the polyurethanes may be made using any of the available diisocyanates, for example 4.4′ diphenyl methane diisocyanate, hexamethylene diisocyanate, or isophorone diisocyanate. We prefer to use a mixture of 80% 2,4 and 20% 2,6 isomers of toluene diisocyanates (TDI).

In an adhesive composition which is intended for use in film form in a process of molding and directly attaching soles of PVC compound to string lasted leather uppers the relative viscosity (as defined) of the polyurethane is preferably in the range from 1.50 to 1.90. In many cases, dependent on the identity of the polyester and the method of making the polyurethane, adhesives according to the invention which form films with excellent application and activation characteristics and which lead to satisfactory adhesive bonds may be formed if the cure index used (i.e. the ratio of NCO groups of the diisocyanate to OH groups of the polyester) is in the range 80 to 100. However in order to produce bonds with superior creep resistance it appears desirable to employ a cure index in excess of 90 and preferably in the range 95 to 98.

The heat softenable polyurethanes may be prepared by a variety of methods including addition of the diisocyanate to molten polyester, or to a suitable solution of the polyester. An advantage of the former case is that the final product may be prepared directly from the polyurethane melt, e.g. by coating, spreading or extrusion to film form. A possible disadvantage with certain products is the very high viscosity which may obtain and in these cases the solution method may be easier to use. Many products are also capable of being prepared in powder form by precipitation of the polymer from solution on cooling, and this preparation method may be of interest in those cases where the product is intended for use other than as a film, e.g. as a powder for sole attaching or garment laminating purposes.

By use of adhesive compositions according to the invention it is possible to provide films which are heat softenable at convenient temperatures and which give bonds of good strength and creep resistance between leather upper materials and injected plasticised PVC soling materials. Further, the preferred adhesive compositions can also be used to provide self-supporting films which may be supplied without interleaving release paper. Naturally, other uses may also be found for adhesive compositions according to the invention.

One application in which films of adhesive composition according to the invention have been found to give satisfactory performancy is the bonding of direct injection molded soles of plasticised PVC to string lasted leather shoe uppers. One method of shoe making illustrative of this aspect is hereinafter described by way of example and comprises shaping a closed leather upper to the shape of a foot form of an injection molding machine by a string lasting technique, closing a sole forming mold cavity of the injection molding machine with a film of adhesive composition trapped between the mold cavity and sole attaching margins of the upper, and injecting hot, molten plasticised PVC sole forming compound to fill the cavity and form a sole firmly bonded to the shoe upper.

In order that the invention may become more clear there now follows a description of ten example adhesive compositions according to the invention, each of which is illustrative of the invention, and of the illustrative method. It is to be understood that the illustrative adhesive compositions and the illustrative method have been selected for description to illustrate the invention by way of example only and not by way of limitation thereof.

EXAMPLE 1

800 gms. of a polyester made from terephthalic acid and a diol mixture consisting of 95 mole % hexandiol-1,6 and 5 mole % pentadiol-1,5 and having a relative viscosity of 1.122, were melted in a heated sigma-blade mixer fitted with airtight seals. With the polyester at 120°C., 140.6 gms. of mixed isomers of 80% 2,4 and 20% 2,6 toluene diisocyanates (hereinafter referred to as TDI), was introduced over a period of 30 mins. via a sealed funnel fitted in the mixer lid. During this stage the temperature reached approximately 140°C. and the viscosity of the melt increased considerably. After a further 60 minutes mixing, the product was tested for free isocyanate, transferred from the mixer to a heated spreader and converted into a film 0.125 mm thick. The relative viscosity of the polyurethane product was 1.725.

EXAMPLE 2

156.3 gms. of a polyester made from terephthalic acid and a diol mixture consisting of 90 mole % hexandiol-1,6 and 10 mole % pentandiol-1,5 and having relative viscosity 1.13, was added to a reaction vessel containing toluol. The stirred system was heated and 0.15 gms. dibutyl tin diluarate were added as catalyst. With the temperature of the mixture at 100°C., 26.5 gms. of mixed isomers of 80% 2,4 and 20% 2,6 toluene diisocyanates, (TDI), were added at a steady rate and the reaction completed. On cooling, polyurethane separating from the solution was collected, dried and converted to a film 0.125 mm thick. The relative viscosity of the produce was 1.675.

In the following examples 3 to 10, films of polyurethanes were made using the method of Example 1 but materials, weights and relative viscosities of the materials were as described below.

EXAMPLE 3

800 gms. of polyester from terephthalic acid and a diol mixture consisting of 95 mole % hexandiol-1,6 and 5 mole % pentandiol-1,5, relative viscosity 1.122, and 135 gms. TDI.

EXAMPLE 4

800 gms. of polyster from hexandiol-1,6 and an acid mixture consisting of 90 mole % terephthalic acid and 10 mole % isophthalic acid, relative viscosity 1.123, and 107.3 gms. TDI.

EXAMPLE 5

900 gms. of poly(hexamethylene terephthalate), relative viscosity 1.11, and 209.6 gms. TDI.

EXAMPLE 6

A polyester from hexane diol-1,6 and an acid mixture of 68 moles % terephthalic acid and 32 mole % isophthalic acid, having a relative viscosity of 1.22, was reacted with TDI at a cure index of 107 to give a polyurethane with a relative viscosity of 1.66.

EXAMPLE 7

A polyester from hexane diol-1,6 and an acid mixture of 68 mole % terephthalic acid and 32 mole % isophthalic acid, having a relative viscosity of 1.14, was reacted with hexamethylene diisocyanate at a cure index of 95 to give a polyurethane with a relative viscosity of 1.69.

EXAMPLE 8

A polyester from terephthalic acid and a diol mixture of 60 mole % hexane diol-1,6 and 40 mole % pentane diol-1,5, having a relative viscosity of 1.13 was reacted with TDI at a cure index of 96 to give a polyurethane with a relative viscosity of 1.57.

EXAMPLE 9

A polyester from hexane diol-1,6 and an acid mixture of 68 mole % terephthalic acid and 32 mole % isophthalic acid, having a relative viscosity of 1.14, was reacted with TDI at a cure index of 95 to give a polyurethane with a relative viscosity of 1.78.

EXAMPLE 10

A polyester from terephthalic acid and a diol mixture of 80 mole % hexane diol-1,6 and 20 mole % pentane diol-1,5, having a relative viscosity of 1.13, was reacted with TDI at a cure index of 98 to give a polyurethane with a relative viscosity of 1.69.

Some properties of the polyurethanes thus made are summarised in Table I. The peel adhesion and creep results were obtained using test samples made by injecting a commercial polyvinyl chloride soling compound at 180°C. onto a 1 × 3 inches sample of roughed upper leather with a film of polyurethane made as above described to provide a one-eighth of an inch thick layer of polyvinyl chloride bonded to the leather. To obtain the peel adhesion test results, the force required to separate the polyvinyl chloride from the leather at 2 inches per minute at room temperature, (24 hours after bonding) was determined. In order to obtain the creep results, the distance that the bond is induced to open when subjected to a separating load of 0.6 kg in 180°peel at 60°C. was determined. It was observed that each of the adhesive films was activated without undue difficulty.

Examination of the results shown in the Table indicates that those adhesive compositions which are derived from polyesters with the larger quantities of the second acid (i.e. isophthalic acid) and which used a cure index of 95 or more show acceptable peel adhesion and creep results. Those adhesive compositions derived from polyesters with the larger quantities of the second diol (i.e. pentane diol-1,5) show acceptable peel adhesion results but exhibit some creep which may nevertheless be acceptable.

In a further series of tests, the freshly prepared adhesive compositions of the Examples were spread onto release paper. It was observed that films of the compositions of Examples 1, 2, 3, 4 and 5 tended rapidly to become crisp and handleable, with little tendency of layers of the film to stick to each other; however, films of the adhesive composition of Example 6 required two days aging at room temperature to approach this condition, and films of the adhesive composition of Example 7 required about 20 hours aging at room temperature to approach this condition.

By way of comparison it is noted that a film of polyurethane cast from a commercial polyurethane adhesive solution, Desmocoll 420, resulted in bonds showing low creep at 60°C. by the Satra Creep Test, but in order to achieve satisfactory bonds to leather, it was necessary to apply an initial priming coat of the adhesive solution to the leather prior to application of the film.

In carrying out the illustrative method, shoes are made in the following way. A leather vamp and leather quarters are sewn together to form an upper, and sole attaching margins of the upper are roughed to a line corresponding to the bite line of a sole attaching mold. A draw string is attached to the outer edge of the roughed area by overlocked thread. Preliminary shaping of the backpart and forepart of the upper may then take place if desired to enable the upper to be suitably conformed to the foot form of an injection molding machine. The upper is placed on the foot form of an injection molding machine, and the draw string tightened and the upper manipulated to draw the upper into appropriate conformity with the foot form, thus bringing the roughed margins of the upper onto the shoe bottom side of the foot form. The ends of the tightened string are secured, and required fillers, e.g. a heel filler block, are fitted to the upper. A film of one or other of the polyurethanes adhesives of the Examples, prepared as hereinbefore described, is located over the opening to a sole mold cavity of a mold arrangement of the injection molding machine, and the foot form brought into register with respect to the cavity. The film of adhesive is thus trapped between the sole attaching margins of the upper on the foot form and the edges of the mold cavity, with the roughed margins touching the film. A plasticised polyvinyl chloride soling compound is injected hot, at about 180°C., into the closed mold cavity, to fill the cavity and press the film against the margins of the upper. Heat from the injected PVC is sufficient is soften the film to a bond forming condition. After a suitable cooling time of the order of two minutes, the foot form is moved from the cavity, carrying with it the upper and sole bonded to it. Excess film of adhesive is trimmed off.

2. An adhesive composition comprising a heat softenable polyurethane having a relative viscosity determined from a solution in reagent grade m-cresol of 1 gm. of the material per 100 cc. of solution according to British Standard Method for the Determination of the Viscosity of Liquids in C.G.S. Units, BS188 : 1957 at 25 + 0.05°C. in a suspended level viscometer, in the range of 1.36 to 2.10, said polyurethane being formed from diisocyanate and a substantially linear hydroxyl bearing polyester material having a relative viscosity of 1.10 to 1.36, said polyester material being made up of acid units of which not less than about 60 mole percent are derived from terephthalic acid and diol units of which not less than about 60 mole percent are derived from hexane diol-1,6 units, said polyester including from about 3 mole percent to about 15 mole percent of pentane diol-1,5 units or from about 2 mole percent to about 10 mole percent of isophthalic acid units based on the total diol or acid units in addition to hexane diol-1,6 derived units and terephthalic acid derived units, said polyurethane having a cure index of from 90 to 100.

3. An adhesive composition according to claim 1 wherein the said polyurethane has a cure index of from 90 to 100 and said polyester includes diol units other than hexane diol-1,6 and/or dicarboxylic acid units other than terephthalic acid in quantity to provide a total substitution in the polyester chain of from about 15 to about 33 mole percent of said other diol and/or said other acid units.

4. An adhesive composition according to claim 3 wherein pentane diol-1,5 derived units provide 15–33 mole % based on the total diol units of the polyester.

5. An adhesive composition according to claim 3 wherein isophthalic acid derived units provide 15–33 mole % based on the total acid units of the polyester.

6. An adhesive composition according to claim 1

TABLE I

| Example No. | Acid Mole % Terephthalic | Acid Mole % Isophthalic | Diol Mole % Hexane | Diol Mole % Pentane | Relative Viscosity of Polyester | Isocyanate | Nominal Cure Index | Relative Viscosity of Polyurethane | Peel Adhesion lb/in. | Creep 0.6Kg | | Ring & Ball Softening Point of Polyurethane |
|---|---|---|---|---|---|---|---|---|---|---|---|---|
| 1 | 100 | — | 95 | 5 | 1.12 | TDI | 98 | 1.73 | 10 | 0.0ins | Melt | 121.5 |
| 2 | 100 | — | 90 | 10 | 1.13 | TDI | 96 | 1.68 | 15 | 0.8 " | Soln. | 116.5 |
| 3 | 100 | — | 95 | 5 | 1.12 | TDI | 95 | 1.61 | 14 | 0.0 " | Melt | 124.0 |
| 4 | 90 | 10 | 100 | — | 1.123 | TDI | 90 | 1.57 | 12 | 1.6 " | Melt | 118.0 |
| 5 | 100 | — | 100 | — | 1.11 | TDI | 90 | 1.43 | 12 | 1.2 " | Melt | 94.0 |
| 6 | 68 | 32 | 100 | — | 1.22 | TDI | 107 | 1.66 | 15 | 0.0 " | Melt | 125.0 |
| 7 | 68 | 32 | 100 | — | 1.14 | HMDI | 95 | 1.69 | 17 | 0.0 " | Melt | 115.5 |
| 8 | 100 | — | 60 | 40 | 1.13 | TDI | 96 | 1.57 | 18 | 1.0 " | Melt | 108.0 |
| 9 | 68 | 32 | 100 | — | 1.14 | TDI | 95 | 1.78 | 24 | 0.0 " | Melt | 113.0 |
| 10 | 100 | — | 80 | 20 | 1.13 | TDI | 98 | 1.69 | 11 | 0.2 " | Melt | 117.0 |

We claim:

1. An adhesive composition comprising a heat softenable polyurethane having a relative viscosity determined from a solution in reagent grade m-cresol of 1 gm. of the material per 100 cc. of solution according to British Standard Methods for the Determination of the Viscosity of Liquids in C.G.S. Units, BS188 : 1957 at 25 + 0.05°C. in a suspended level viscometer, in the range 1.36 to 2.10 formed from diisocyanate and substantially linear hydroxyl bearing polyester material said polyester material being made up of acid units of which not less than about 60 mole % are derived from terephthalic acid and diol units of which not less than about 60 mole % are derived from hexane diol-1,6 units, said polyurethane having a cure index of from 80 to 100.

wherein the polyester is a poly (hexamethylene terephthalate) with a relative viscosity determined from a solution in reagent grade m-cresol of 1 gm. of the material per 100 cc. of solution according to British Standard Methods for the Determination of the Viscosity of Liquids in C.G.S. Units, BS188 : 1957 at 25 + 0.05°C. in a suspended level viscometer, of 1.10 to 1.20.

7. An adhesive composition as defined in claim 1 in which said adhesive composition is a substantially solvent-free film, the cure index is in excess of 90 and the relative viscosity of said polyurethane is from 1.50 to 1.90.

8. An adhesive composition as defined in claim 4 in which said adhesive composition is a substantially solvent-free film, the cure index is from 95 to 98 and the relative viscosity of said polyurethane is from 1.50 to 1.90.

9. An adhesive composition as defined in claim 5 in which said adhesive composition is a substantially solvent-free film, the cure index is from 95 to 98 and the relative viscosity of said polyurethane is from 1.50 to 1.90.

10. An adhesive composition as defined in claim 6 in which said adhesive composition is a substantially solvent-free film, the cure index is from 95 to 98 and the relative viscosity of said polyurethane is from 1.50 to 1.90.

* * * * *